US012218610B1

(12) United States Patent
Wang et al.

(10) Patent No.: US 12,218,610 B1
(45) Date of Patent: Feb. 4, 2025

(54) SENSOR SYSTEM WITH AN INTERIOR SENSOR AND A PIEZOELECTRIC POWER SUPPLY

(71) Applicants: CNPC USA Corporation, Houston, TX (US); BEIJING HUAMEI, INC., Beijing (CN); CHINA NATIONAL PETROLEUM CORPORATION, Beijing (CN)

(72) Inventors: Jinjun Wang, Houston, TX (US); Weixiong Wang, Houston, TX (US); Jayson Byrd, Houston, TX (US); Chris Cheng, Houston, TX (US); Xiongwen Yang, Beijing (CN); Qi Peng, Beijing (CN); Xiaohua Ke, Beijing (CN); Kevin Waddell, Houston, TX (US); Chi Ma, Beijing (CN)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

(21) Appl. No.: 18/230,654

(22) Filed: Aug. 6, 2023

(51) Int. Cl.
 *E21B 47/103* (2012.01)
 *E21B 41/00* (2006.01)
 *E21B 47/013* (2012.01)
 *H02N 2/18* (2006.01)

(52) U.S. Cl.
 CPC ......... *H02N 2/186* (2013.01); *E21B 41/0085* (2013.01); *E21B 47/013* (2020.05)

(58) Field of Classification Search
 CPC .... H02N 2/186; E21B 47/013; E21B 41/0085
 See application file for complete search history.

(56) References Cited

U.S. PATENT DOCUMENTS

| | | |
|---|---|---|
| 7,064,676 B2 | 6/2006 | Hall et al. |
| 7,604,072 B2 | 10/2009 | Pastusek et al. |
| 8,100,196 B2 | 1/2012 | Pastusek et al. |
| 8,596,381 B2 | 12/2013 | Hall et al. |
| 10,167,718 B2 | 1/2019 | Pelletier et al. |
| 11,111,732 B2 | 9/2021 | Zhan et al. |
| 11,346,207 B1 | 5/2022 | Alshaikh et al. |
| 2013/0048381 A1* | 2/2013 | Habernal ............ E21B 47/013 175/50 |

(Continued)

*Primary Examiner* — Taras P Bemko
(74) *Attorney, Agent, or Firm* — Craft Chu PLLC; Andrew W. Chu

(57) ABSTRACT

The drilling system withstands downhole conditions at the bottom of the borehole and drilling conditions due to the constant movement and vibration. The drilling system includes a drill bit and a sensor system with a system housing, a primary power supply and interior sensor. The primary power supply includes piezoelectric panels for converting radial vibration into energy. The interior sensor is locally powered by the primary power supply at the remote downhole location at the bottom of the borehole. The interior sensor collects data related to a downhole condition and is in communication with the primary power supply to generate confirmed data based on the amount of energy generated by the primary power supply. The confirmed data is more accurate and reliable than the data collected by the interior sensor and can be used to guide the path of the drill bit through the rock formation in drilling operations.

20 Claims, 4 Drawing Sheets

(56) References Cited

U.S. PATENT DOCUMENTS

| | | |
|---|---|---|
| 2013/0014763 A1 | 6/2013 | Sumrall et al. |
| 2015/0218940 A1* | 8/2015 | Pelletier ................ E21B 10/602 |
| | | 175/41 |
| 2019/0338630 A1* | 11/2019 | Zhang ..................... E21B 17/10 |
| 2021/0032936 A1* | 2/2021 | Zhan ....................... E21B 12/02 |
| 2021/0040844 A1* | 2/2021 | Wisinger, Jr. ........... E21B 45/00 |
| 2023/0125043 A1* | 4/2023 | Munakata ............ B23K 20/233 |
| | | 228/1.1 |
| 2023/0371390 A1* | 11/2023 | Tanaka ................ H10N 30/872 |

* cited by examiner

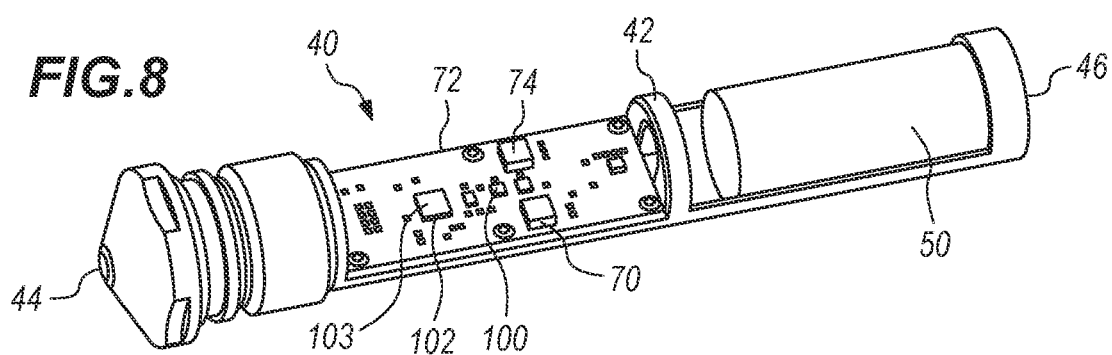
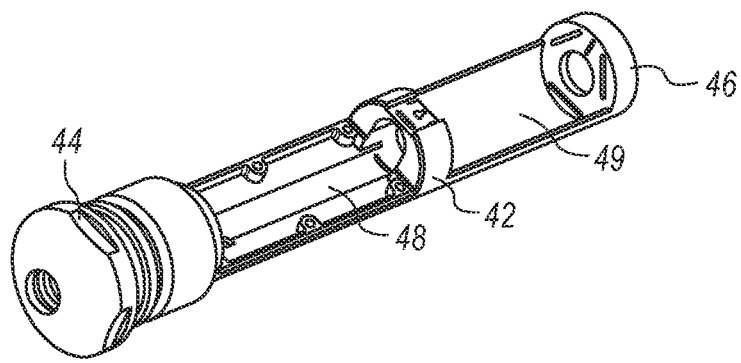
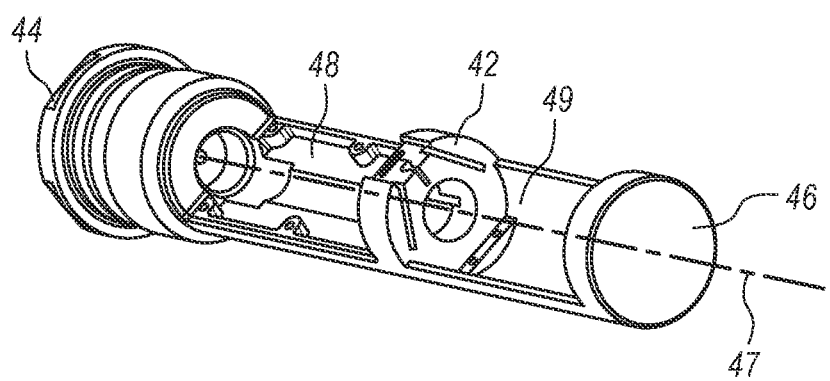
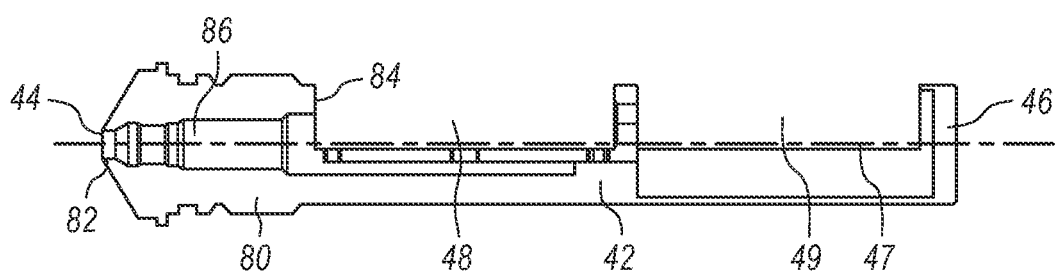

SENSOR SYSTEM WITH AN INTERIOR SENSOR AND A PIEZOELECTRIC POWER SUPPLY

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to control of drilling based on downhole conditions at the bottom of the borehole. More particularly, the present invention relates a sensor powered by piezoelectric generator in the drill bit of the bottom hole assembly at the downhole location. Even more particularly, the present invention relates to a sensor cooperative with a piezoelectric power supply for powering the sensor and confirming data collected by the sensor so that the downhole conditions can more accurately be determined for precise control of the drill bit, while drilling.

2. Description of Related Art Including Information Disclosed Under 37 CFR 1.97 and 37 CFR 1.98

A borehole is drilled through a geological formation deep in the earth to discover and produce hydrocarbons, such as oil and gas. A borehole can be formed by a drill string comprised of a drill bit connected to sections of long pipe or drill pipe. The drill string extends from the surface to the bottom of the borehole. The drill bit is rotated so that the drill string advances through the geological formation, thereby forming the borehole. The drill bit can be rotated by rotating the drill string from the surface in rotary drilling. Steering the drill bit requires data of the downhole conditions so that position, orientation, and velocity of the drill bit can be determined. Then, the position, orientation, and velocity of the drill bit can be altered to drill the desired path of borehole through the geological formation. Collected data is used to generate estimates and projections for the drill bit to navigate through and around the geological formations. Weight on Bit (WOB), Mud Pump Pressure, Rate of Penetration (ROP), Gravity Toolface (GTF), Inclination (INC) and Azimuth (AZI) and other traditional oil field measurements, like depth, temperature and pressure, are used to determine Projection to Bit (PTB), True Vertical Depth (TVD) and other estimates of the borehole. The PTB is particularly relevant for the position and orientation of the borehole end when the drill bit is at the bottom of the borehole. The PTB and other projections, not actual measurements at the bottom of the hole.

Estimating a downhole condition is not as accurate as actually measuring the downhole condition. The directly measured data can be used to increase the accuracy of the previous projected borehole conditions. Actual data, instead of estimates calculated from large distances away, make the determination of borehole conditions more accurate.

Various patents and publications have been granted or published to disclose a sensor on the drill bit for direct measurement at the end of the borehole. U.S. Pat. No. 7,064,676, issued on 20 Jun. 2006 to Hall et al., U.S. Pat. No. 7,604,072, issued on 20 Oct. 2009 to Pastusek et al, U.S. Pat. No. 8,100,196, issued on 24 Jan. 2012 to Pastusek et al, U.S. patent Ser. No. 11/111,732, issued on 7 Sep. 2021 to Zhan et al, and U.S. Pat. No. 11,346,207, issued on 31 May 2022 to Alshaikh et al, all disclose a sensor system, power supply, and firmware for measurement of borehole conditions at the drill bit. The location on the drill bit and exposure to excessive vibration and drilling contact are addressed by fixed mounting in the body of the drill bit. Conventional power supplies including batteries and wired power through the bottom hole assembly. U.S. Pat. No. 10,167,718, issued on 1 Jan. 2019 to Pelletier et al, adds a piezoelectric power source for an optical sensor on the drill bit. U.S. Pat. No. 8,596,381, issued on 3 Dec. 2013 Hall et al discloses a center mounted pressure sensor power by piezoelectric elements.

The excessive movement and vibrations at the bottom of the borehole usually hinder the durability and accuracy of sensors at this location. Sensor placement on a drill bit is also remote and requires a reliable local power source that cannot be regularly accessed for recharging. Prior art batteries and piezoelectric power sources can address the remoteness of the location on the drill bit, but the data collected from sensors remains unreliable. Prior art sensor systems have added additional sensors further up the borehole or additional sensors on the drill bit to repeat the same distortions for easier detection. There is still a need for providing remote power and more accurate data.

It is an object of the present invention to provide a sensor system of a drilling assembly to guide the drilling operation with accurate data of downhole conditions.

It is an object of the present invention to provide a sensor system with a local and reliable power source in the drill bit at the bottom of the borehole.

It is an object of the present invention to provide a sensor cooperative with piezoelectric power supply for power and data collection.

It is another object of the present invention to provide a piezoelectric power supply for converting radial vibration, torsional vibration, and vertical vibration into energy for a sensor on a drill bit.

It is another object of the present invention to provide a sensor cooperative with piezoelectric power supply, an additional sensor, and an additional piezoelectric power supply for power and data collection.

It is still another object of the present invention to provide a sensor system with a plurality of sensors and a local and reliable piezoelectric power source in the drill bit.

It is yet another object of the present invention to provide a sensor system with a plurality of sensors, a power management module, a control module, and a piezoelectric power source to guide the drilling operation with accurate data of downhole conditions.

It is an object of the present invention to provide a method of using a sensor system to control a drill bit according to data authenticated by a piezoelectric power supply.

These and other objectives and advantages of the present invention will become apparent from a reading of the attached specification, drawings and claims.

BRIEF SUMMARY OF THE INVENTION

Embodiments of the present invention include a drilling system with a sensor system to guide the drill path through the rock formation. The drilling system includes a drill bit, and the sensor system is on the drill bit at the remote downhole location at the bottom of the borehole. The sensor system includes a system housing, a primary power supply comprised of piezoelectric panels for converting radial vibration into energy, and an interior sensor connected to the primary power supply. The interior sensor collects data at the remote downhole location on the drill bit at the bottom of the borehole. In some embodiments, the interior sensor is an accelerometer, and the data collected is vibration data. The movement and vibration of the drill bit is converted to energy for powering the interior sensor. The interior sensor and the primary power supply are in communication so as to generate confirmed data based on the vibration data collected by the interior sensor and the amount of energy generated by the piezoelectric panels of the primary power supply. The confirmed data has the accuracy and reliability for guiding the drill bit and controlling drilling operations.

The system housing of the sensor system can have a distal end, a proximal end, a center housing axis, a center chamber, and a power chamber. The power chamber is at the proximal end. The center housing axis extends longitudinally through the system housing. This center housing axis can be coaxial with an axis of an interior channel of the drill bit.

The primary power supply is mounted in the power chamber and comprises a plurality of piezoelectric panels radially arranged around the center housing axis within the power chamber. There is at least one housing capacitor connected to the plurality of piezoelectric panels to store energy generated by the piezoelectric panels. The piezoelectric panels are evenly distributed around the center housing axis. Each piezoelectric panel can be comprised of a piezoelectric element and an electrode plate. The primary power supply can also include additional piezoelectric components, such as torsional vibration energy generator and a vertical vibration energy generator. In embodiments with both the vertical vibration energy generator and the torsional vibration energy generator, the primary power supply generates energy from three different vibration orientations in order to power the interior sensor at the remote downhole location on the drill bit. The confirmed data can now be based on the amount of energy and the data collected by the interior sensor.

The interior sensor is connected to the primary power supply. There can be multiple interior sensor, depending on the amount of energy generated by the primary power supply and management of the amount of energy. The interior sensor, or any of the interior sensors, can be a temperature sensor, a weight sensor, an inclination sensor, an azimuth sensor, a depth sensor, pressure sensor, a vibration sensor, or an accelerometer or other sensor for a downhole condition. One interior sensor may be an accelerometer in one orientation, while another interior sensor is an accelerometer in a different orientation. In some embodiments, the drilling system includes a circuit board, and the interior sensor is mounted on the circuit board.

The interior sensor and the primary power supply are connected so as to power the interior sensor with the energy generated by the piezoelectric panels. The interior sensor and the primary power supply are also in communication to generate confirmed data based on the data collected by the interior sensor and the amount of energy generated by the primary power supply. The interior sensor can be an accelerometer for collecting vibration data, and the confirmed data is based on the vibration data and the amount of energy generated by the primary power supply. The confirmed data can be used to guide the path of the drill bit through the rock formation to form the desired borehole.

Embodiments of the present invention include the drill system comprising a holder. The sensor system can be housed in the holder for mounting in the interior channel of the drill bit. The holder can have a support body to set the placement of the system housing within the drill bit.

Other embodiments include the sensor system comprising a cap body and a sensor body. The cap body is incorporated with the system housing, and the sensor body is removably mounted in the cap body. The sensor body is comprised of an exterior sensor and a secondary power supply connected to the exterior sensor. The exterior sensor can be a pressure sensor, and the secondary power supply is comprised of a piezoelectric body. The sensor body, the interior sensor, and primary power supply are in communication so as to generate the confirmed data based on the different collected data and the amount of energy generated by the primary power supply. In some embodiments, the confirmed data is also based on the amount of energy generated by the secondary power supply.

For embodiments with the circuit board, the drilling system can include the electronics for data processing, such as a power management module and a control module. The computer hardware and firmware are mounted on the circuit board for data storage, processing, analysis, and communication. The power management module and control module are mounted on the circuit board to be powered by the primary power supply. The control module can include a communication means to transmit data and receive commands by wireless or wired communication. The drilling system includes at least the interior sensor and the primary power supply being in communication with the power management module and the control module so as to generate the confirmed data based on the data related to a downhole condition and the amount of energy generated by the primary power supply.

The method for drilling the rock formation to form a borehole for oil and gas exploration and production includes deploying the drilling system into a rock formation and drilling a borehole with the drill bit and power the interior sensor with the primary power supply. The method includes collecting the data related to the downhole condition by the interior sensor, and generating confirmed data based on the data related to the downhole condition and an amount of energy generated by the primary power supply. The method finally includes controlling the drill bit according to the confirmed data related to the downhole condition.

BRIEF DESCRIPTION OF THE SEVERAL VIEWS OF THE DRAWINGS

FIG. 8 is another perspective view of an embodiment of the sensor system, according to the drilling system of the present invention.

FIG. 9 is a perspective view of an embodiment of the system housing, according to the drilling system of the present invention.

FIG. 10 is another perspective view of the embodiment of the system housing, according to FIG. 9.

FIG. 11 is an elevation view of the embodiment of the system housing, according to FIG. 9.

DETAILED DESCRIPTION OF THE INVENTION

A sensor on the drill bit is subjected to both extreme downhole conditions at the bottom of the borehole and extreme drilling conditions due to the constant movement and vibration of the drill bit. These dual extreme conditions frequently result in inconsistent and less precise data, and the power source for this sensor must also be durable for these conditions on the drill bit. The drilling system 10 of the present invention addresses both the local power source at the remote location and data accuracy by a sensor system 40 with a piezoelectric power supply cooperative with an interior sensor. The movement and vibration of the drill bit is converted to energy for powering the interior sensor, and the interior sensor and piezoelectric power supply are in communication so as to generate confirmed data based on data collected at the downhole location by the interior sensor and the amount of energy generated by the piezoelectric power supply.

Figure 1:
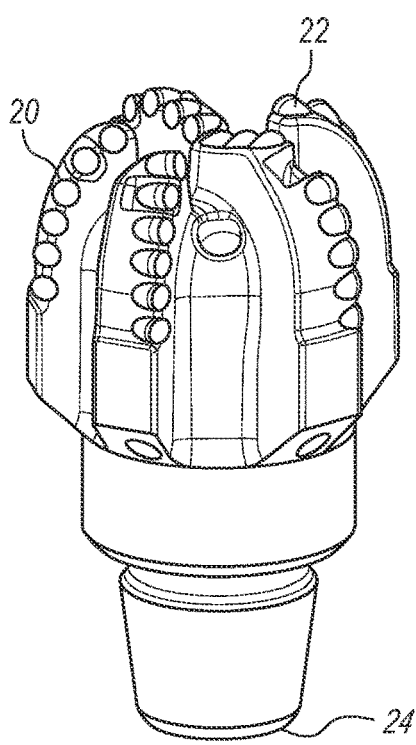
FIG. 1 is a perspective view of an embodiment of the drilling system, according to the present invention.
Figure 2:
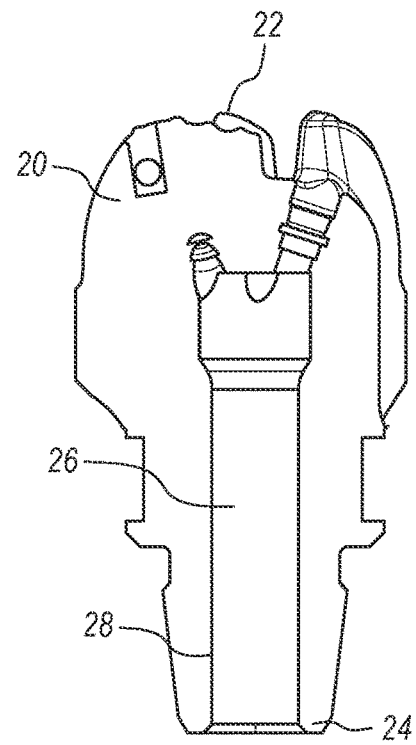
FIG. 2 is a sectional view of an embodiment of the drill bit, according to the drilling system of the present invention.
Figure 3:
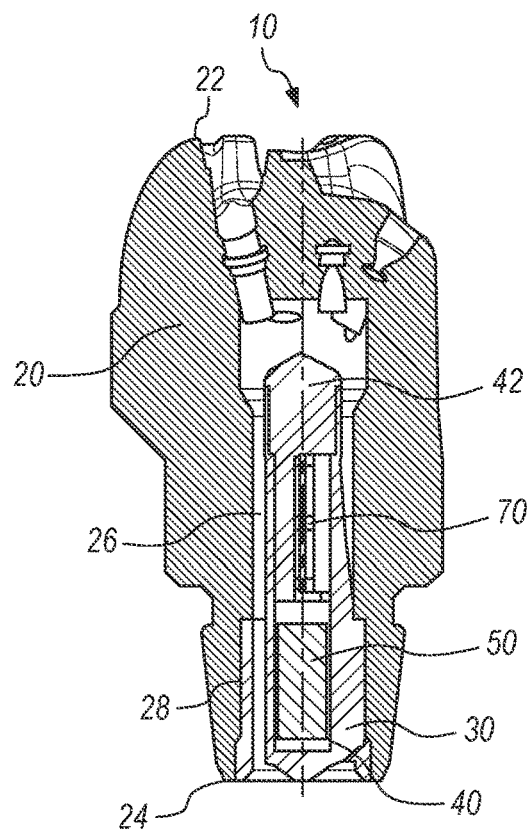
FIG. 3 is a sectional view of an embodiment of the drill system, according to the drilling system of the present invention.

FIGS. 1-3 show the drilling system 10 of the present invention for drilling a borehole into a rock formation. The borehole creates access to zones within the rock formation for production of oil and gas. The drilling system 10 includes a drill bit 20 having a terminal end 22, a connection end 24 opposite the terminal end, and an interior channel 26 extending from the connection end toward the terminal end, and a sensor system 40. The drill bit 20 has cutters to engage the rock formation, and there can be other channels and cavities within the drill bit 20 for other accessories, like force modulation control devices. In the present invention, there is at least this interior channel 26 for the sensor system 40. The embodiment of the interior channel 26 is shown as centrally located within the drill bit. Other locations within the drill bit 20 may also be possible.

FIGS. 3, 4, and 6-8 show the sensor system 40 comprising a system housing 42, a primary power supply 50, and an interior sensor 70. FIGS. 9-11 show embodiments of the system housing 42 having a distal end 44, a proximal end 46 opposite the distal end, a center housing axis 47, a center chamber 48 between the distal end and the proximal end, and a power chamber 49 between the center chamber and the proximal end. The power chamber 49 is at the proximal end 46. The center housing axis 47 extends longitudinally through the system housing 42. This center housing axis 47 can be coaxial with an axis of the interior channel 26 of the drill bit 20.

Figure 6:
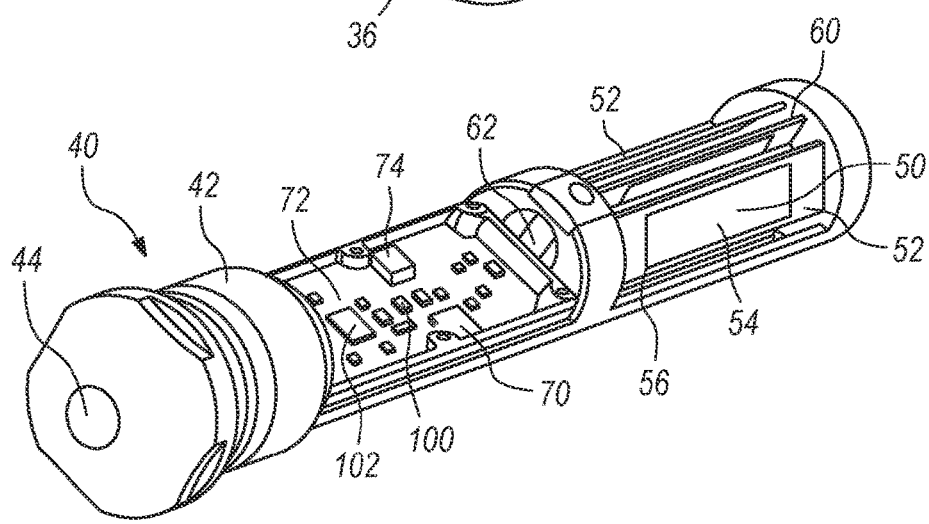
FIG. 6 is a perspective view of an embodiment of the sensor system having an embodiment of a primary power supply, according to the drilling system of the present invention.
Figure 7:
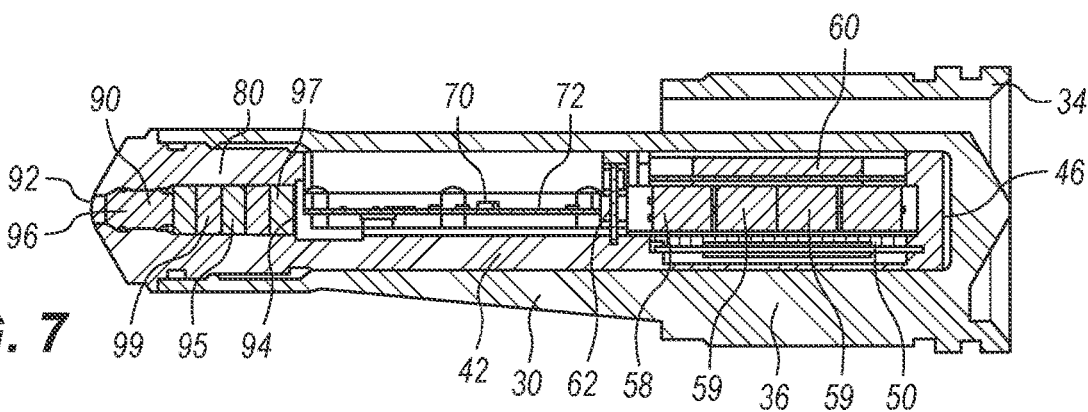
FIG. 7 is a sectional view of the embodiment of the sensor system having the embodiment of a primary power supply, according to FIG. 6, and a holder of the drilling system of the present invention.

The primary power supply 50 is mounted in the power chamber 49 and is schematically shown in FIG. 8. FIGS. 6-7 show embodiments with the primary power supply 50 comprising a plurality of piezoelectric panels 52 radially arranged around the center housing axis 47 within the power chamber 49. There is a housing capacitor 58 connected to the plurality of piezoelectric panels 52. The piezoelectric panels 52 convert radial vibration into energy, which is stored in the housing capacitor 58. In some embodiments, there is an additional housing capacitor 59. There can be multiple capacitors to store the energy generated by the piezoelectric panels 52. FIGS. 6-8 show the interior sensor 70 being connected to the primary power supply 50. Data related to downhole conditions is collected by the interior sensor 70. In one embodiment of the present invention, the interior sensor 70 can be an accelerometer so that vibration data is the data collected by the interior sensor 70. The interior sensor 70 and the primary power supply 50 are in communication so as to generate confirmed data based on the data related to a downhole condition, such as vibration data, and an amount of energy generated by the primary power supply 50. In one embodiment, the vibrations of the drill bit 20 are measured by the interior sensor 70 as vibration data, and the same vibrations are converted to an amount of energy stored in the housing capacitor 58 from radial vibration of the piezoelectric panels 52. The confirmed data is based on the vibration data confirmed or corrected by the amount of energy from radial vibration generated by the primary power supply 50. The vibration data, directly measured at the remote downhole location, can now be adjusted to remove noise and distortion. The amount of energy generated by the primary power supply is another measure of vibration data, and the two measurements of vibration data can determine confirmed data with increased accuracy and reliability. The confirmed data can be used to guide the path of the drill bit through the rock formation to form the desired borehole. Instead of projections of vibration data at the remote downhole location and less reliable vibration data collected at the remote downhole location, the present invention generates confirmed data.

Figure 12:
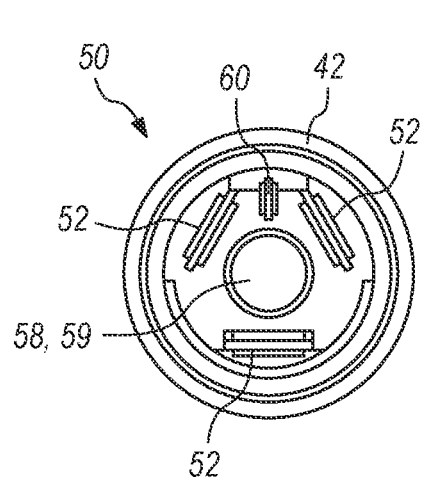
FIG. 12 is an end elevation view of an embodiment of the primary power supply in the power chamber of the system housing, according to the drilling system of the present invention.
Figure 13:
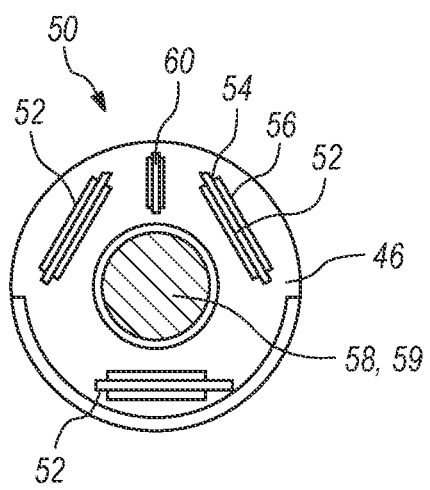
FIG. 13 is an opposite end elevation view of the embodiment of the primary power supply in the power chamber of the system housing, according to the drilling system of the present invention.

FIGS. 6-7 and 12-13 show embodiments of the plurality of piezoelectric panels 52 being evenly distributed around the center housing axis 47. FIGS. 12-13 show three piezoelectric panels 52 distributed every 120 degrees around the center housing axis. Each piezoelectric panel 52 can be comprised of a piezoelectric element 54 and an electrode plate 56. The piezoelectric panels 52 are connected in series or in parallel to the housing capacitor 58, and possibly additional housing capacitors 59.

Embodiments of the primary power supply 50 further comprise a torsional vibration energy generator 60. The torsional vibration energy generator 60 can be piezoelectric, electromagnetic, or electrostatic. In addition to the radial vibration energy generated by the primary power supply 50, torsional vibration energy can be captured for use at the remote downhole location. The torsional vibration energy generator 60 being piezoelectric is an embodiment of the present invention shown in FIGS. 6-7. FIGS. 12 and 13 also show the torsional vibration energy generator 60 as a piezoelectric element that converts torsional vibration into energy by extending longitudinally through the power chamber 49 parallel to the center housing axis 47. The torsional vibration energy generator 60 is also connected to the housing capacitor 58.

FIGS. 3-4 and 6-8 show the drilling system 10 with the interior sensor 70 as an accelerometer. Other embodiments include the interior sensor 70 being a different type of sensor. In one alternate embodiment, the interior sensor 70 is comprised of an azimuth sensor with the data being torsion data. When the primary power supply 50 includes the torsional vibration energy generator 60, the confirmed data is based on the amount of energy generated by the primary power supply 50 and the data from the azimuth sensor as the interior sensor 70.

Figure 4:
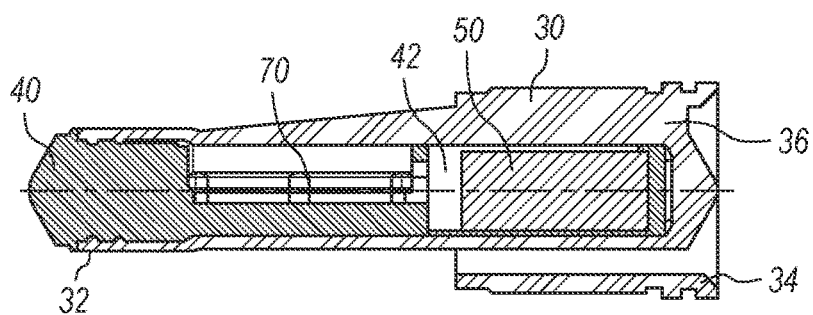
FIG. 4 is a sectional view of a sensor system and holder, according to an embodiment of the drilling system of the present invention.

A further embodiment of the primary power supply 50 comprises a vertical vibration energy generator 62 as shown in FIGS. 3-4. The vertical vibration energy generator 62 can be piezoelectric, electromagnetic, or electrostatic. The vertical vibration energy generator 62 being piezoelectric is an embodiment of the present invention shown in FIGS. 6-7. In addition to the radial vibration energy generated by the primary power supply 50, vertical vibration energy can be generated at the remote downhole location. FIGS. 6-7 show the vertical vibration energy generator 62 extending orthogonal to the center housing axis 47 and being mounted in the power chamber 49 between the plurality of piezoelectric panels 52 and the center chamber 48. The vertical vibration energy generator 62 is also connected to the housing capacitor 58. When the primary power supply 50 includes the vertical vibration energy generator 62, the confirmed data is based on the amount of energy generated by the primary power supply 50 and the vibration data from the interior sensor 70.

In embodiments with both the vertical vibration energy generator 62 and the torsional vibration energy generator 60, the primary power supply 50 generates energy from three different vibration orientations in order to power the interior sensor 70 at the remote downhole location on the drill bit 20. The confirmed data can now be based on the amount of energy and the data of different types of interior sensors 70, including accelerometers in different orientations.

FIGS. 6 and 8 show embodiments with the sensor system 40 comprising multiple interior sensors 70, 74. An additional interior sensor 74 can also be connected to the primary power supply 50 so as to collect additional data related to an additional downhole condition. The additional interior sensor 74 can be a temperature sensor, a weight sensor, an inclination sensor, an azimuth sensor, a depth sensor, a pressure sensor, a vibration sensor, or an accelerometer. Still another interior sensor 74 can collect data related to yet another additional downhole condition. Various combinations include the interior sensor 70 as an accelerometer and an additional interior sensor 74 as a temperature sensor. The temperature and vibration data can be used to determine downhole conditions more accurately for guidance of the drill bit through the rock formation. Alternate embodiments further include the additional interior sensor 74 and the primary power supply 50 being in communication so as to generate confirmed data based on the data corresponding to another downhole condition by the additional interior sensor 75 and the amount of energy generated by the primary power supply 50. For example, the interior sensor 70 as an accelerometer in one orientation and the additional interior sensor 74 as another accelerometer in a different orientation can both be in communication with the primary power supply 50 to generate confirmed data based on the respective vibration data from each accelerometer and the amount of energy generated by the primary power supply 50.

FIGS. 3-4 and 6-8 show the drilling system 10 comprising a circuit board 72 in the center chamber 48. The interior sensor 70 can be mounted on the circuit board 72, and the primary power supply 50 is connected to the circuit board 72 in order to connect to the interior sensor 70.

FIGS. 3 and 4 show embodiments of the drill system 10 with a holder 30. The sensor system 40 can be housed in the holder 30 so as to be positioned in the interior channel 26 of the drill bit 20. As drilling mud flows through the interior channel 26 of the drill bit 20, the drilling mud can pass through the holder 30. The drilling mud can flow through the holder 30 so that the sensor system 40 can be exposed to the drilling mud for the interior sensor 70 and any additional interior sensor 74 can detect downhole conditions, including downhole conditions related to the drilling mud. The holder 30 can stabilize the sensor system 40 and set the placement and orientation in the drill bit 20 and in the flow of drilling mud. As shown in FIG. 3, the holder 30 can mount the sensor system 40 in the interior channel 26 as centrally located within the drill bit 20. The holder 30 has a first end 32 and a second end 34 opposite the first end 32. FIG. 3 shows the first end 32 facing the terminal end 22 of the drill bit 20 and the second end 34 facing the connection end 24 of the drill bit 20. The drilling mud flows through interior channel 26 of the drill bit 20 during the drilling operation. Downhole conditions, including downhole conditions of the drilling mud, can be detected by the interior sensor 70 and any additional interior sensor 74, including a pressure sensor exposed to the drilling mud.

Figure 5:
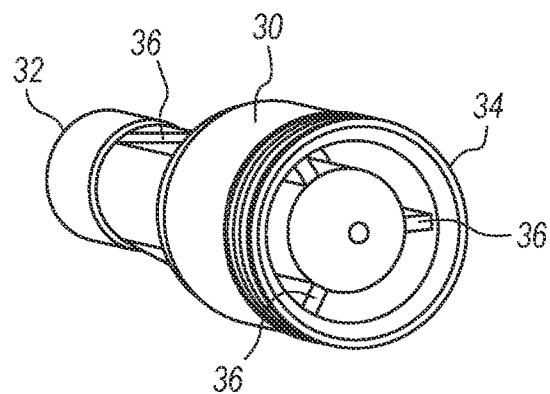
FIG. 5 is a perspective view of the holder, according to an embodiment of the drilling system of the present invention.

Embodiments of the holder 30 include at least one support body 36 at the second end 34 as shown in FIG. 5. The support body 36 can be a wedge-shaped post that allows drilling mud in the interior channel 26 to flow through the holder 30 and around the sensor system 40. FIG. 5 shows three support bodies 36 as wedge-shaped posts being equally distributed around a perimeter of the holder 30 at a ring portion of the second end 34. The support body 36 sets the position and placement within the drill bit 20 and the stabilization of the sensor system 40 relative to the drill bit 20. The downhole conditions, including the downhole conditions of the drilling mud, can be detected by the sensor system 40. The support body 26 can engage the interior channel wall 28 of the interior channel 26, while the first end remains suspended within the interior channel 26 without touching the interior channel wall 28. The interior sensor 70 is connected to the system housing 42 different than the piezoelectric panels 52 so as to achieve a different vibration at the interior sensor 70 than the piezoelectric panels 52 in the power chamber 49. The differential can be used to generate the confirmed data based on the vibration data of the interior sensor 70 as an accelerometer and the amount of energy generated by the primary power supply 50.

Figure 14:
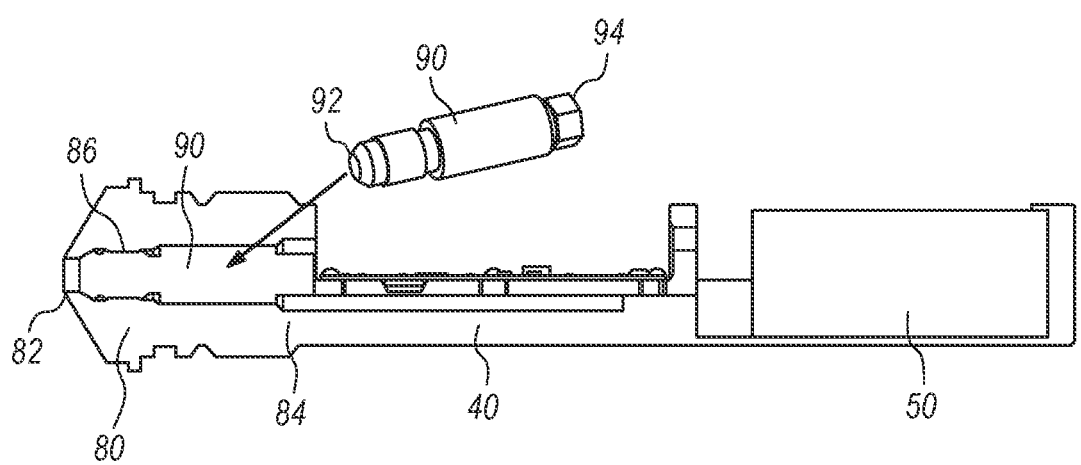
FIG. 14 is an elevation view of an embodiment of the cap body of the system housing and sensor body, according to the drilling system of the present invention.

FIGS. 6, 7, and 14 show an embodiment of the sensor system 40 comprising a cap body 80 and a sensor body 90. The cap body 80 is incorporated with the system housing 42 between the center chamber 48 and the distal end 44. The cap body 80 can be made integral with the system housing 42. The cap body 80 has a distal cap end 82, a proximal cap end 84 opposite the distal cap end, and a cap channel 86 extending from the distal cap end 82 toward the proximal cap end 84. The sensor body 90 is removable mounted into the cap channel 86. The sensor body 90 has a distal sensor body end 92 and a proximal sensor body end 94 opposite the distal sensor body end. In FIG. 7, the sensor body 90 is comprised of an exterior sensor 96 and a secondary power supply 98 connected to the exterior sensor 96. The exterior sensor 96 can be a pressure sensor. The secondary power supply 98 is positioned at the distal cap end 82 to convert pressure into energy. In some embodiments, the secondary power supply 98 is comprised of a piezoelectric body 99, and a sensor body capacitor 97 connected to the piezoelectric body 99. Additional sensor body capacitors can be added as needed. FIG. 7 further shows an embodiment of the secondary power supply 98 being further comprised of a thermoelectric generator 95 connected to the sensor body capacitor 97 so as to convert heat into energy stored in the sensor body capacitor 97. The thermoelectric generator 95 can be aligned with the piezoelectric body 99 within the cap channel 86.

Components similar to the cap body 80 and sensor body 90 are in the prior art. There are other locally powered pressure sensors on a tip of a drill bit. However, cap body 80 and sensor body 90 of the drilling system 10 are in a different location within the drill bit 20. Furthermore, the relationship of the sensor body 90 to the interior sensor 70 and primary power supply 50 are completely new to the prior art. In embodiments with the interior sensor 70 as a pressure sensor, the pressure data of the interior sensor 70 and the amount of energy generated by the secondary power supply 98 can be generate confirmed data for guidance of the drill bit 20. In some embodiments, the confirmed data is also based on the pressure data from the exterior sensor 96.

The embodiments with the circuit board 72 further show the drilling system 10 comprising a power management module 100 and a control module 102. The power management module 100 and the control module 102 are computer hardware and firmware mounted on the circuit board 72 for data storage, processing, analysis, and communication. The power management module 100 is mounted on the circuit board to be powered by the primary power supply 50. The power management module 100 is in communication with both the primary power supply 50 and any interior sensors 70, 74 of embodiments of the drilling system 10. The interior sensor 70 is powered locally at the remote location on the drill bit 20, and other components, like additional interior sensors 74, at the remote location can also be powered locally by the primary power supply 50. The control module 102 is in communication with the interior sensor 70 and the primary power supply 50 for the data related to a downhole condition from the interior sensor 70 and the amount of energy generated by the primary power supply 50. The control module 102 can include a communication means 103, such as an antenna, to transmit data and receive commands by wireless or wired communication. The drilling system 10 at the remote location on the drill bit 20 may not complete all processing of all data from interior sensors locally on the drill bit 20. There can be shared process of the data so that more complex drilling systems 10 with multiple interior sensors 70, 74 can generate confirmed data for guidance of the drill bit 20 based on the amount of energy generated by the primary power supply 50 and any interior sensor 70, 74.

The drilling system 10 includes at least the interior sensor 70 and the primary power supply 50 being in communication with the power management module 100 and the control module 102 so as to generate the confirmed data based on the data related to a downhole condition and the amount of energy generated by the primary power supply 50. In embodiments with additional interior sensors 74, those additional interior sensors 74 are also in communication with the power management module 100 and the control module 102. In embodiments with the sensor body 90, the secondary power supply 98 and the exterior sensor 96 are also in communication with the power management module 100 and the control module 102. The control module 102 in communication with the primary power supply 50, secondary power supply 98, the interior sensor 70, and the exterior sensor 96 can generate confirmed data based on data from the interior sensor 70, data from the exterior sensor 96, the amount of energy generated by the primary power supply 50, and an amount of energy generated by the secondary power supply 98, depending on the type of interior sensor 70 and exterior sensor 90.

In the embodiment of the exterior sensor 90 as a pressure sensor, the pressure data and the amount of energy generated by the secondary power supply 98 by a piezoelectric body 99 can generate the confirmed data. In the embodiment of an additional interior sensor 74 being a temperature sensor, the temperature data can generate the confirmed data based on the amount of energy for the secondary power supply 98 having a thermoelectric generator 95 connected the sensor body capacitor 97. In the embodiment of the interior sensor 70 as an accelerometer, the data being vibration data, the vibration data can generate the confirmed data based on the amount of energy generated by the primary power supply 50 and the amount of energy generated by the secondary power supply 98.

Embodiments of the present invention include a method for drilling the rock formation to form a borehole for oil and gas exploration and production. The method includes deploying the drilling system 10 into a rock formation and drilling a borehole with the drill bit 20. The interior sensor 70 is powered by the primary power supply 50. The method includes collecting the data related to the downhole condition by the interior sensor 70, and generating confirmed data based on the data related to the downhole condition and an amount of energy generated by the primary power supply 50. The method finally includes controlling the drill bit 20 according to the confirmed data related to the downhole condition. The step of powering the interior sensor 70 comprises the step of converting radial vibration of the system housing 42 into energy.

The method can be performed with the sensor system 40 having the cap body 80 and the sensor body 90. With this accessory, the method further comprises collecting pressure data by the exterior sensor 96, and powering the exterior sensor 96 with the secondary power supply 98. The method further includes generating confirmed pressure data based on the pressure data and an amount of energy generated by the secondary power supply 98. The confirmed pressure data can also be used in the step of controlling the drill bit.

Using data to guide a drill bit relies on the accuracy of the data. Improving the accuracy of data consequently improves the guidance of the drill bit. The lack of accuracy of data at the bottom of the borehole has been a persistent problem. The extreme drilling conditions of sensors on the drill bit itself and the extreme downhole conditions have always contributed to inaccurate and inconsistent data from sensors on the drill bit. More reliable data is available from sensors further away from the drill bit along the drill string, and mathematical projections are used to estimate the actual conditions of the drill bit at the bottom of the borehole. The present invention reverses the trend of placing sensors further from the drill bit and introduces an alternative improvement of data from the interior sensor on the drill bit.

The drilling system of the present invention has a sensor system with an interior sensor in the drill bit and a piezoelectric power supply. The interior sensor is connected to the piezoelectric power supply to be powered at the remote downhole location on the drill bit at the bottom of the borehole. The interior sensor and the piezoelectric power supply are in communication to generate confirmed data based on the data collected by the interior sensor and the amount of energy generated by the piezoelectric power supply. The confirmed data has improved accuracy over the data collected by the interior sensor, and the confirmed data has reliability sufficient for guiding the drilling operation. The drilling system includes a local and reliable power supply for the interior sensor in the drill bit at the remote bottom of the borehole location. The primary power supply based on piezoelectric panels provides power to the interior sensor, and the amount of energy generated and data collected by the interior sensor can generate confirmed data with improved accuracy and reliability, such as confirmed vibration data from the interior sensor as an accelerometer. The primary power supply can be a piezoelectric power supply for converting radial vibration, torsional vibration, and vertical vibration into energy. The primary power supply can power at least the interior sensor. Multiple interior sensors can be powered so that more than one type of data collected from respective interior sensors. The drilling system can generate confirmed data based on these different data collected and the amount of energy generated by the primary power supply with improved accuracy and reliability.

Prior art piezoelectric powered pressure sensors can be integrated into the sensor system of the present invention. The confirmed data can also be based on the pressure data from these pressure sensors and secondary piezoelectric power supply. A second piezoelectric power supply does not change the relationship between the interior sensor and the primary power supply of the present invention.

The drilling system can also incorporate electronics for the data processing. These relationships between a power management module and a control module to the interior sensors and piezoelectric panels are included. The drilling path of the drill bit can be determined by controlled guidance of confirmed data based on real time data collected from sensors and the amount of energy from piezoelectric panels on the drill bit at the bottom of the borehole, the most remote location in the borehole.

The foregoing disclosure and description of the invention is illustrative and explanatory thereof. Various changes in the details of the illustrated structures, construction and method can be made without departing from the true spirit of the invention.

We claim:

1. A drilling system, comprising:
  a drill bit having a terminal end, a connection end opposite the terminal end, and an interior channel extending from the connection end toward the terminal end; and
  a sensor system being mounted in the interior channel and comprising:
    a system housing having a distal end, a proximal end opposite the distal end, a center housing axis being co-axial with said interior channel, a center chamber between the distal end and the proximal end, and a power chamber between the center chamber and the proximal end, said center chamber being co-axial with said interior channel;
    a primary power supply being mounted in the power chamber and being comprised of:
      a plurality of piezoelectric panels radially arranged around the center housing axis within the power chamber so as to convert radial vibration into energy; and
      a housing capacitor connected to the plurality of piezoelectric panels; and
    an interior sensor being mounted in said center chamber and being connected to the primary power supply so as to collect data related to a downhole condition,
    wherein the interior sensor and the primary power supply are in communication so as to generate confirmed data based on the data related to a downhole condition and an amount of energy generated by said primary power supply.

2. The drilling system, according to claim 1, wherein said plurality of piezoelectric panels is comprised of three piezoelectric panels evenly distributed around said center housing axis.

3. The drilling system, according to claim 1, wherein each piezoelectric panel of said plurality of piezoelectric panels is comprised of a piezoelectric element and an electrode plate.

4. The drilling system, according to claim 1, wherein said primary power supply further comprises an additional housing capacitor connected to said housing capacitor.

5. The drilling system, according to claim 1, wherein said primary power supply further comprises a torsional vibration energy generator, extending longitudinally through the power chamber parallel to the center housing axis and being connected to the housing capacitor, so as to convert torsional vibration into energy.

6. The drilling system, according to claim 1, wherein said primary power supply further comprises a vertical vibration energy generator, extending orthogonal to the center housing axis, being mounted in the power chamber between the plurality of piezoelectric panels and the center chamber, and being connected to the housing capacitor so as to convert vertical vibration into energy.

7. The drilling system, according to claim 1, wherein said interior sensor is comprised of an accelerometer, said data related to said downhole condition being vibration data, said confirmed data being confirmed vibration data based on said vibration data and said amount of power generated by said primary power supply.

8. The drilling system, according to claim 1, further comprising: a circuit board, said interior sensor being mounted on said circuit board.

9. The drilling system, according to claim 1, wherein said sensor system further comprises:
  a cap body between said center chamber and said distal end having a distal cap end, a proximal cap end opposite said distal cap end, and a cap channel extending from said distal cap end toward the proximal cap end; and a sensor body being removable mounted into said cap channel and having a distal sensor body end and a proximal sensor body end opposite said distal sensor body end,
wherein said sensor body is comprised of:
an exterior sensor being comprised of a pressure sensor and being positioned at the distal cap end of the cap body so as to convert pressure into energy; and
a secondary power supply connected to the exterior sensor,
wherein said secondary power supply is comprised of:
a piezoelectric body; and
sensor body capacitor connected to said piezoelectric body.

10. The drilling system, according to claim 1, wherein said secondary power supply is further comprised of a thermoelectric generator connected to said sensor body capacitor so as to convert heat into energy.

11. The drilling system, according to claim 1, wherein said sensor system further comprises:
an additional interior sensor being connected to said primary power supply so as to collect data related to another downhole condition,
wherein said confirmed data is based on said data related to another downhole condition, said data related to said downhole condition and said amount of power generated by said primary power supply.

12. The drilling system, according to claim 1, wherein said interior sensor is an accelerometer, and
wherein the additional interior sensor is selected from a group consisting of: a temperature sensor, a weight sensor, an inclination sensor, an azimuth sensor, a depth sensor, a pressure sensor, a vibration sensor, and an accelerometer.

13. The drilling system, according to claim 1, further comprising: a circuit board, said interior sensor being mounted on said circuit board, said primary power supply being connected to said circuit board.

14. A method for drilling, comprising the steps of:
deploying the drilling system, according to claim 1, into a rock formation;
drilling a borehole with said drill bit;
powering said interior sensor with said primary power supply;
collecting said data related to said downhole condition by said interior sensor; and
generating said confirmed data based on said data related to said downhole condition and said amount of energy generated by said primary power supply,
wherein the step of powering said interior sensor comprises the step of converting radial vibration into energy; and
controlling said drill bit according to said confirmed data.

15. The method for drilling, according to claim 14, wherein the sensor system further comprises:
a cap body between said center chamber and said distal end having a distal cap end, a proximal cap end opposite said distal cap end, and a cap channel extending from said distal cap end toward the proximal cap end; and
a sensor body being removable mounted into said cap channel and having a distal sensor body end and a proximal sensor body end opposite said distal sensor body end,
wherein said sensor body is comprised of:
an exterior sensor being comprised of a pressure sensor and being positioned at the distal cap end of the cap body so as to convert pressure into energy; and
a secondary power supply connected to the exterior sensor,
wherein said secondary power supply is comprised of:
a piezoelectric body; and
sensor body capacitor connected to said piezoelectric body,
the method further comprising the steps of:
powering said exterior sensor with said secondary power supply;
collecting pressure data by said exterior sensor; and
generating confirmed pressure data based on said pressure data and an amount of power generated by the secondary power supply,
wherein the step of controlling said drill bit is according to said confirmed pressure data.

16. A drilling system, comprising:
a drill bit having a terminal end, a connection end opposite the terminal end, and an interior channel extending from the connection end toward the terminal end;
a sensor system being mounted in the interior channel and comprising:
a system housing having a distal end, a proximal end opposite the distal end, a center housing axis being co-axial with said interior channel, a center chamber between the distal end and the proximal end, and a power chamber between the center chamber and the proximal end, said center chamber being co-axial with said interior channel;
a primary power supply being mounted in the power chamber and being comprised of:
a plurality of piezoelectric panels radially arranged around the center housing axis within the power chamber so as to convert radial vibration into energy; and
a housing capacitor connected to the plurality of piezoelectric panels; and
an interior sensor being connected to the primary power supply so as to collect data related to a downhole condition,
wherein the interior sensor and the primary power supply are in communication so as to generate confirmed data based on the data related to a downhole condition and an amount of energy generated by said primary power supply; and
a holder having a first end and a second end opposite said first end, said holder being comprised of a support body at said second end,
wherein said power chamber is removably mounted in said holder so as to position said sensor system in said interior channel with flow through said holder and around said sensor system.

17. A drilling system, comprising:
a drill bit having a terminal end, a connection end opposite the terminal end, and an interior channel extending from the connection end toward the terminal end;
a sensor system being mounted in the interior channel and comprising:
a system housing having a distal end, a proximal end opposite the distal end, a center housing axis, a center chamber between the distal end and the proximal end, and a power chamber between the center chamber and the proximal end;
a primary power supply being mounted in the power chamber and being comprised of:
   a plurality of piezoelectric panels radially arranged around the center housing axis within the power chamber so as to convert radial vibration into energy; and
   a housing capacitor connected to the plurality of piezoelectric panels; and
an interior sensor being connected to the primary power supply so as to collect data related to a downhole condition,
wherein the interior sensor and the primary power supply are in communication so as to generate confirmed data based on the data related to a downhole condition and an amount of energy generated by said primary power supply;
a circuit board, said interior sensor being mounted on said circuit board;
a power management module being mounted on said circuit board and being in communication with said primary power supply and said interior sensor; and
a control module being in communication with said interior sensor and said primary power supply,
wherein said interior sensor and said primary power supply are in communication with said power management module and said control module so as to generate said confirmed data.

18. The drilling system, according to claim 17, wherein said interior sensor is comprised of an accelerometer, said data related to said downhole condition being vibration data, said confirmed data being based on said vibration data and said amount of power generated by said primary power supply.

19. The drilling system, according to claim 17, wherein the sensor system further comprises:
   a cap body between said center chamber and said distal end having a distal cap end, a proximal cap end opposite said distal cap end, and a cap channel 86 extending from said distal cap end toward the proximal cap end; and
   a sensor body being removable mounted into said cap channel and having a distal sensor body end and a proximal sensor body end opposite said distal sensor body end,
wherein said sensor body is comprised of:
   an exterior sensor being comprised of a pressure sensor and being positioned at the distal cap end of the cap body so as to convert pressure into energy; and
   a secondary power supply connected to the exterior sensor,
wherein said secondary power supply is comprised of:
a piezoelectric body; and
sensor body capacitor connected to said piezoelectric body,
wherein said control module is in communication with said interior sensor, said primary power supply, said exterior sensor, and said secondary power supply so as to generate said confirmed data.

20. The drilling system, according to claim 19, wherein said interior sensor is comprised of an accelerometer, said data related to said downhole condition being vibration data, said confirmed data being based on said vibration data, said amount of power generated by said primary power supply, and an amount of power generated by said secondary power supply.

* * * * *